United States Patent [19]
Berg et al.

[11] Patent Number: 5,856,896
[45] Date of Patent: Jan. 5, 1999

[54] GIMBAL SUSPENSION FOR SUPPORTING A HEAD IN A DISC DRIVE ASSEMBLY

[75] Inventors: Lowell J. Berg, Minnetonka, Minn.; Joseph Cheng-Tsu Liu, Singapore, Singapore; Zine-Eddine Boutaghou, Vadnais Heights, Minn.

[73] Assignee: Seagate Technology, Inc., Scotts Valley, Calif.

[21] Appl. No.: 852,225

[22] Filed: May 6, 1997

Related U.S. Application Data

[60] Provisional application Nos. 60/032,348 Dec. 4, 1996 and 60/031,578 Dec. 5, 1996.

[51] Int. Cl.$^6$ ...................................................... G11B 5/48
[52] U.S. Cl. ............................................................... 360/104
[58] Field of Search ............................................... 360/104

[56] References Cited

U.S. PATENT DOCUMENTS

| | | | |
|---|---|---|---|
| 4,947,275 | 8/1990 | Hinlein | 360/104 |
| 5,079,659 | 1/1992 | Hagen | 360/104 |
| 5,105,408 | 4/1992 | Lee et al. | 369/44.15 |
| 5,384,432 | 1/1995 | Noro et al. | 360/104 X |
| 5,392,179 | 2/1995 | Sendoda | 360/104 |
| 5,428,490 | 6/1995 | Hagen | 360/104 |
| 5,519,552 | 5/1996 | Kohira et al. | 360/104 |
| 5,677,814 | 10/1997 | Osaka et al. | 360/104 |
| 5,717,543 | 2/1998 | Ito et al. | 360/104 X |

OTHER PUBLICATIONS

"An Experiment for Head Positioning System Using Sub-micron Track–width GMR head" by Yoshikawa et al., *IEEE Transactions on Magnetics*, vol. 32, No. 5, Sep., 1996.

"Transverse Mode Electrostatic Microactuator for MEMS-based HDD Slider" by Imamura et al., 0–7803–2985–6/96, *IEEE 1996*.

"A Flexural Piggyback Milli–Actuator for Over 5 Gbit/in.$^2$ Density Magnetic Recording" by Koganezawa et al., *IEEE Transactions on Magnetics*, vol. 32, No. 5, Sep., 1996.

"A Dual–stage Magnetic Disk Drive Actuator Using a Piezoelectric Device for a High Track Density" by Mori, et al., *IEEE, Transactions on Magnetics*, vol. 27, No. 6, Nov., 1991.

"Dynamic Loading Criteria for 3½ Inch Inline HDD Using Multilayer Piezoelectric Load/Unload Mechanism" by Kajitani et al., *IEEE Transactions on Magnetics*, vol. 27, No. 6, Nov., 1991.

"Piezoelectric Microactuator Compensating for Off–Track Errors in Magnetic Disk Drives" by Imamura et al., *Advances in Information Storage Systems*, vol. 5, 1993 American Society of Mechanaical Engineers.

"Micro Electrostatic Actuators in Dual–Stage Disk Drives With High Track Density" by Tang et al., *IEEE Transactions on Magnetics*, vol. 32, No. 5, Sep. 1996.

*Primary Examiner*—John H. Wolff
*Attorney, Agent, or Firm*—Westman, Champlin & Kelly, P.A.

[57] ABSTRACT

A gimbal for supporting a slider at its leading surface in a disc drive assembly includes a gimbal body, a slider support beam and a slider mounting tab. The slider support beam is carried by the gimbal body and defines a vertical slider alignment feature. The slider mounting tab extends out of plane from the slider support beam and defines a horizontal slider alignment feature. The slider mounting tab is attached to the leading surface of the slider. The design of the slider mounting tab of the present invention is useful for supporting a leading edge microactuator at a leading edge of the slider for micropositioning a transducer over ideal track centers on a disc surface.

26 Claims, 5 Drawing Sheets

GIMBAL SUSPENSION FOR SUPPORTING A HEAD IN A DISC DRIVE ASSEMBLY

CROSS-REFERENCE TO RELATED APPLICATION

This application claims priority from Provisional Application No. 60/032,348, filed Dec. 4, 1996, and entitled "GIMBAL FOR LEADING EDGE ACTUATED SLIDER," and from Provisional Application No. 60/031,578, filed Dec. 5, 1996, and entitled "PIEZOELECTRIC ACTUATOR." Cross-reference is also made to related Application No. 08/852,087, filed on even date herewith and entitled "SLIDER-MOUNTED MICROACTUATOR."

BACKGROUND OF THE INVENTION

The present invention relates to a disc drive storage system. In particular, the present invention relates to an improved gimbal suspension which supports a disc head slider at its leading edge.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track to track across the surfaces of the discs under control of electronic circuitry. The actuator mechanism includes a track accessing arm and a suspension for each head gimbal assembly. The suspension includes a load beam and a gimbal. The load beam provides a preload force which forces the slider toward the disc surface. The gimbal is positioned between the slider and the load beam, or is integrated in the load beam, to provide a resilient connection that allows the slider to pitch and roll while following the topography of the disc. It is important that the gimbal be designed to withstand and distribute flexure forces so that the suspension system does not fail due to fatigue.

The slider includes an air bearing surface which faces the disc surface. As the disc rotates, the disc drags air under the slider along the air bearing surfaces in a direction approximately parallel to the tangential velocity of the disc. As the air passes beneath the air bearing surface, skin friction on the air bearing surface causes the air pressure between the disc and the air bearing surface to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc.

The slider preferably flies with a positive pitch in which the leading edge of the slider flies at a greater distance from the disc surface than the trailing edge. This ensures that the transducer, which is typically carried at the trailing edge, remains close to the disc surface and provides a stable fly height profile across the disc surface. Tolerance variations during attachment of the slider to the gimbal relative to the location of the preload force can alter the pitch angle of the slider as well as the alignment characteristics of the slider. It is desirable to provide a gimbal which facilitates the attachment of a slider to the gimbal to produce a head gimbal assembly having the desired pitch characteristics as well as alignment characteristics.

In addition, accurate positioning of the transducer relative to the data tracks is important for accurate, reliable recording. As the track spacing or track "pitch" continues to decrease in modern disc drives, it becomes increasingly difficult for traditional actuators to accurately position a transducer over the ideal center of a desired data track. As a result, microactuation devices have been proposed to improve the ability of the actuator system to finely position a transducer over the ideal track center.

Another difficulty in positioning the transducer arises with the use of magnetoresistive ("MR") heads. In an MR head, there is an offset between the active magnetic centers of the read transducer and write transducer on a single MR head. Because of mask misalignment during manufacture, the read and write transducers can be spatially separated from one another to a greater or lesser degree than otherwise desired. Thus, when the MR head is finally positioned over a track during a write operation, that same position is not the ideal track center for the MR head during the read operation. Since the read transducer is spatially separated from the write transducer, the MR head must be radially moved within the track, or repositioned within the track, so that the read transducer position is over the ideal track center.

The problem of spatial separation is further complicated because the skew angle (the angle of the MR head with respect to a track on a disc surface) changes in different zones on the disc surface. Thus, the effective spatial separation in the read and write transducers on the MR head also changes across the disc surface.

Thus, it is desirable to provide a suspension system which can facilitate microactuation control of the slider about the yaw axis to finely position the read and write transducers over the ideal track centers and to compensate for skew angle.

SUMMARY OF THE INVENTION

The gimbal of the present invention supports a slider at its leading surface. The gimbal includes a gimbal body, a slider support beam and a slider mounting tab. The slider support beam is carried by the gimbal body and defines a vertical slider alignment feature. The slider mounting tab extends out of plane from the slider support beam and defines a horizontal slider alignment feature. The slider mounting tab is attached to the leading surface of the slider.

In one embodiment, the gimbal body includes opposed gimbal arms supported in a spaced relation to define a gap therebetween. A cross beam extends between the opposed gimbal arms. The slider support beam extends from the cross beam into the gap, and the slider mounting tab extends from a distal end of the slider support beam. A shear compliant layer is attached between the slider support beam and an upper surface of the slider. A microactuator is attached between the slider mounting tab and the leading surface of the slider to allow microactuation of the slider relative to the slider support beam about the yaw axis. The design of the slider mounting tab of the present invention is capable of supporting a slider with a micro-actuator attached to a leading end of the slider for micropositioning of the transducer over the ideal track center.

In another embodiment, the slider is attached to the gimbal solely at the leading surface of the slider. A lubricant is preferably applied between the upper surface of the slider and the slider support beam to minimize wear and debris caused by movement of the slider relative to the slider support beam.

DETAILED DESCRIPTION OF THE PREFERRED EMBODIMENTS

Figure 1:
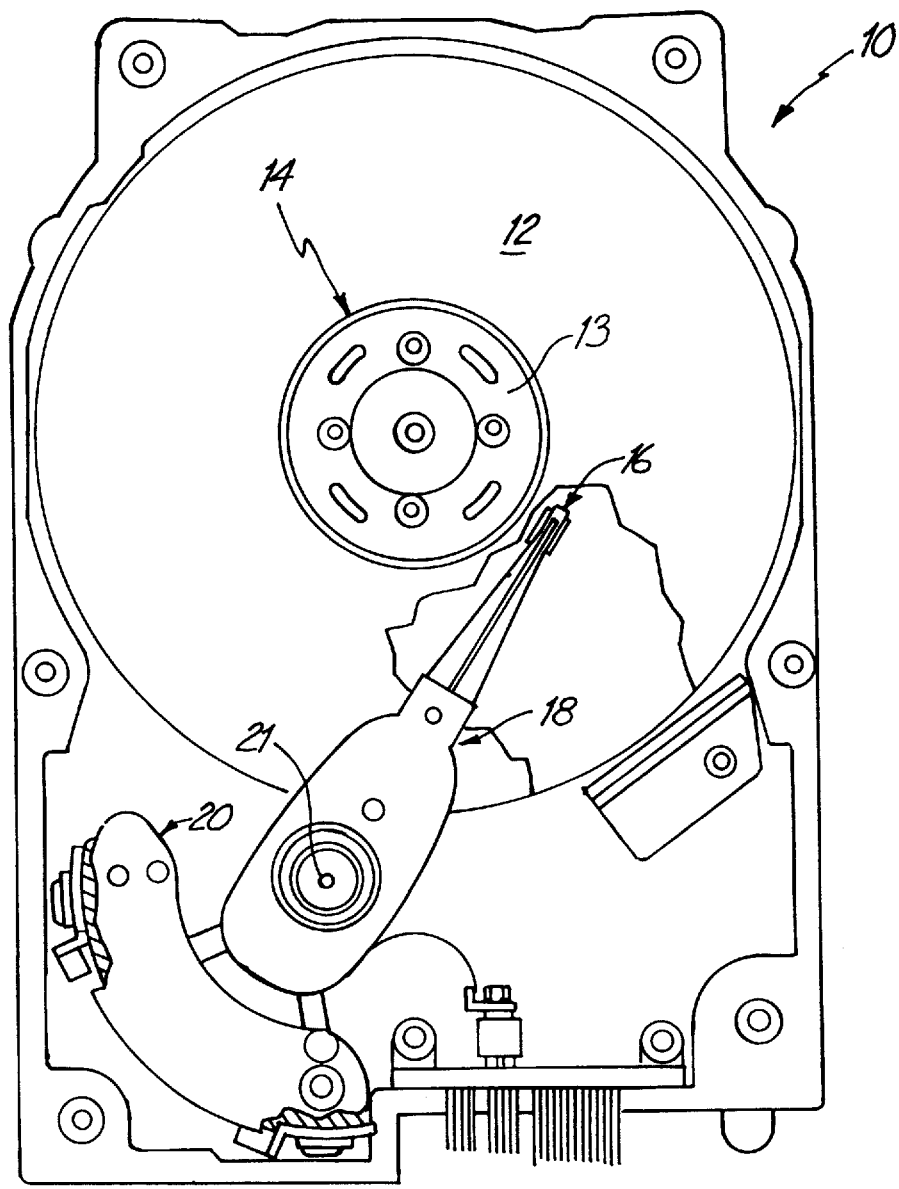
FIG. 1 is a plan view of a hard disc drive assembly according to the present invention.

FIG. 1 is a plan view of a typical disc drive 10. Disc drive 10 includes a disc pack 12, which is mounted on a spindle motor 13 by a disc clamp 14. Disc pack 12 includes a plurality of individual discs which are mounted for co-rotation about a central axis. Each disc surface has an associated head gimbal assembly (HGA) 16 which is mounted to disc drive 10 through an actuator assembly 18. The actuator assembly shown in FIG. 1 is of the type known as a rotary moving coil actuator and includes a voice coil motor (VCM), shown generally at 20. Voice coil motor 20 rotates actuator assembly 18 with its attached HGAs 16 about a pivot axis 21 to position HGAs 16 over a desired data track under the control of electronic circuitry housed within disc drive 10.

Figure 2:
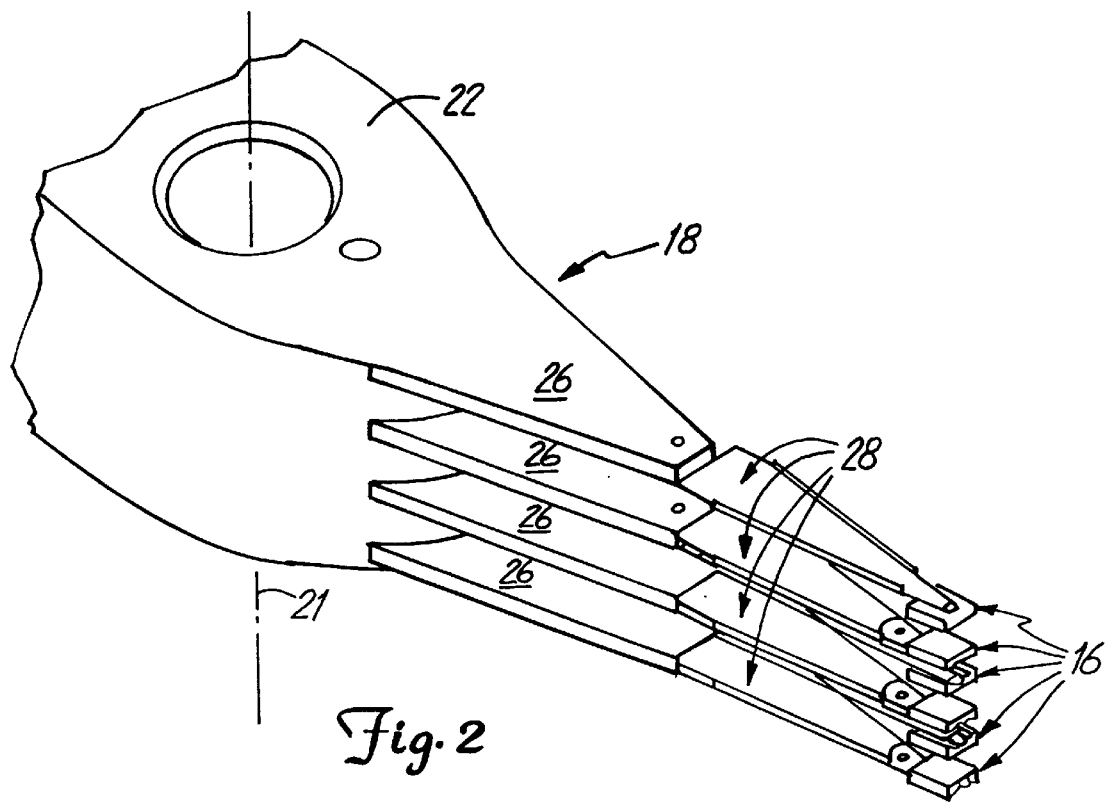
FIG. 2 is a perspective view of an actuator assembly within the disc drive shown in FIG. 1.

FIG. 2 is a perspective view of actuator assembly 18, which includes pivot axis 21, base 22, a plurality of rigid actuator arms 26 and a plurality of load beams 28. Actuator arms 26 support load beams 28 which, in turn, support HGAs 16.

Figure 3B:
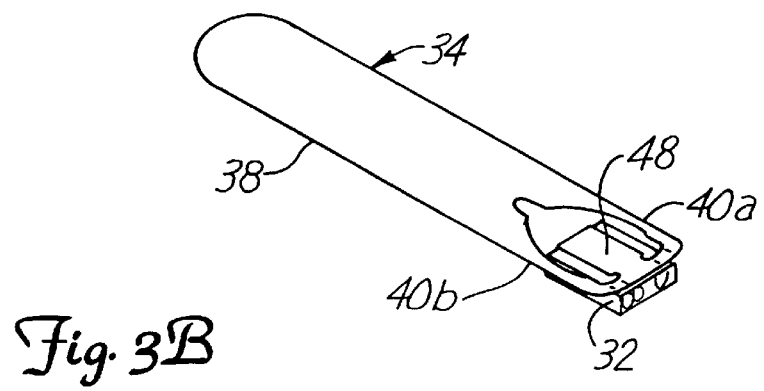
FIG. 3B is a perspective view of the slider attached to the gimbal shown in FIG. 3A.
Figure 3A:
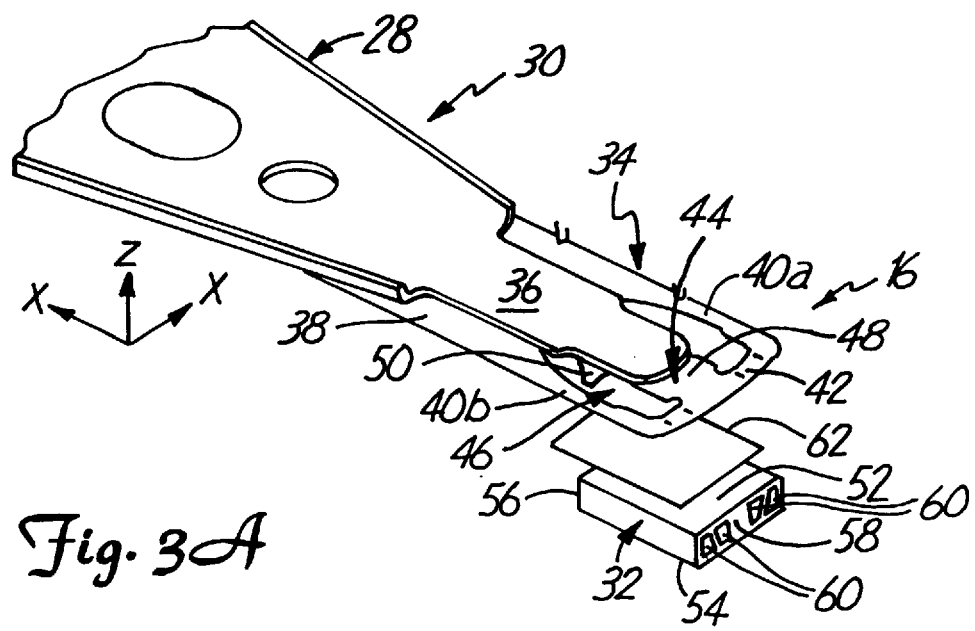
FIG. 3A is a partially exploded, perspective view of a suspension assembly having a load beam, gimbal and slider according to the present invention.

FIG. 3A is a partially exploded, perspective view of one of the load beams 28. Load beam 28 supports HGA 16, which includes slider 32 and gimbal 34. Load beam 28 and gimbal 34 together form a suspension for slider 32. Load beam 28 has a load tab 36, which supplies a preload force to the upper surface of gimbal 34 through a load point button (not shown). Gimbal 34 includes an elongated portion 38, gimbal arms 40a and 40b, cross beam 42 and central tongue 44. Elongated portion 38 is attached to load beam 28 by a weld or an adhesive, for example. Gimbal arms 40a and 40b extend from elongated flexure portion 38 in a spaced relation to define a slider support gap 46 therebetween. The distal ends of gimbal arms 40a and 40b are connected to one another via cross beam 42. Central tongue 44 has a cantilevered slider support beam or member 48 which extends from cross beam 42 within slider support gap 46.

Slider 32 is formed of an elongated member having an upper surface 52, a lower bearing surface 54, leading surface 56 and a trailing surface 58. A plurality of electrical bond pads 60 are formed on trailing surface 58 to provide a location to electrically couple leads (not shown) to the read and write transducers, which are carried by slider 32. The leads can include individual wires or a flex cable routed along load beam 28 or can include conductors that are integrated within load beam 28.

Slider support beam 48 extends in a plane that is generally parallel to upper surface 52 of slider 32. Slider support beam 48 is lengthened relative to support beams in gimbals of the prior art such that there is enough material to extend beyond leading surface 56 of slider 32. The material extending beyond leading surface 56 is bent downward into a right angle to form slider mounting tab 50, which is generally parallel to leading surface 56. The angle between slider mounting tab 50 and slider support beam 48 is preferably matched to the angle between leading surface 56 and upper surface 52 of slider 32 such that slider mounting tab 50 is substantially parallel with leading surface 56.

When assembled, leading surface 56 of slider 32 is attached to and supported by slider mounting tab 50, as shown in FIG. 3A. Preferably, upper surface 52 of slider 32 is also attached to slider support beam 48. However, a compliant shear layer 62 is coupled between upper surface 52 of slider 32 and the lower surface of slider support beam 48 with an adhesive, for example, to permit relative lateral motion between slider 32 and slider support beam 48, as discussed in greater detail below. Compliant shear layer 62 is preferably a mylar film having a thickness of approximately 50 microns. Alternatively, upper surface 52 of slider 32 may be lubricated with a common disc lubricant, for example, to reduce wear and debris caused by movement of slider 32 relative to slider support beam 48.

During assembly, slider mounting tab 50 not only provides a surface at which to attach slider 32, but also allows slider 32 to be aligned relative to the gimbal in two directions. Slider 32 is aligned in a vertical direction Z by the lower surface of slider support beam 48 and is aligned in a longitudinal direction Y by slider mounting tab 50. By locating slider 32 in two directions off gimbal 34 instead of alignment features in a tooling assembly, the slider can be accurately positioned with a low tolerance relative to the location at which load beam 28 applies the preload force to gimbal 34. This provides a more accurate control over the pitch angle of slider 32 relative to the disc surface. Also in the suspension system described, the design of central tongue 44 provides for maximum surface area for distributing the preload force and other operating stresses in the gimbal to reduce wear and fatigue.

Figure 4:
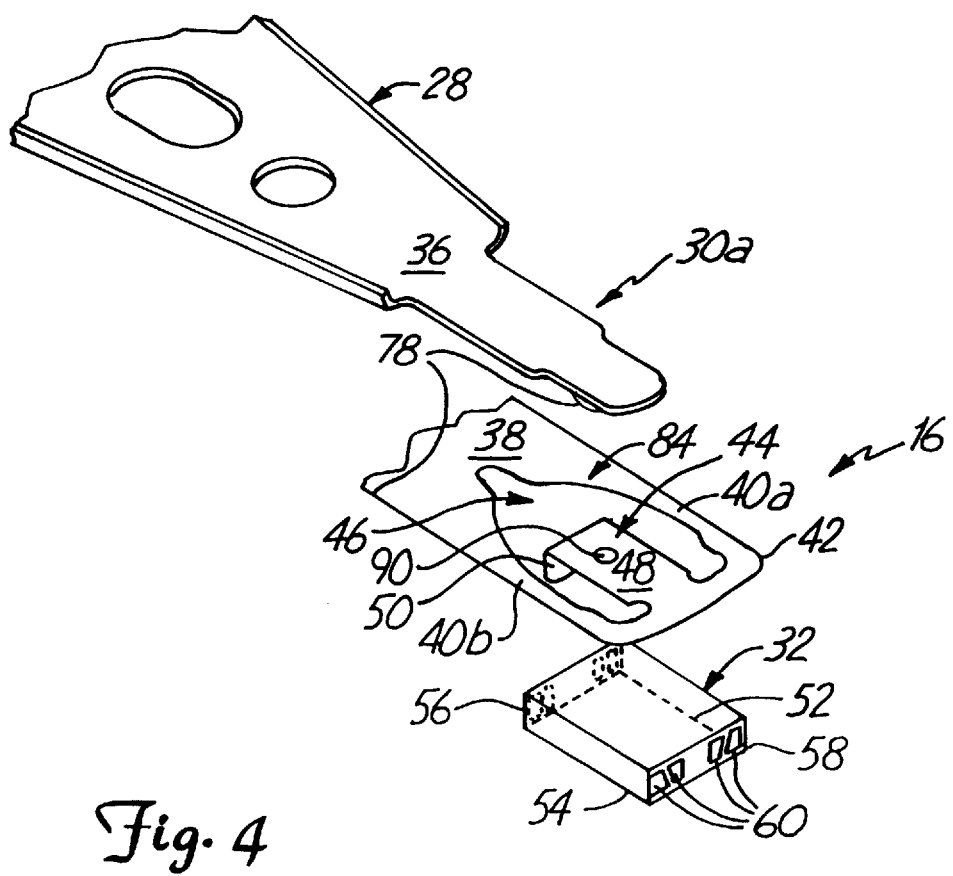
FIG. 4 is an exploded, perspective view a suspension assembly according to an alternative embodiment of the present invention.

FIG. 4 illustrates an alternative embodiment of the present invention. The same reference numerals are used in FIG. 4 as were used in the previous figures for the same or similar elements. Load beam 28 includes a load point button 78 on the under surface of load tab 36. Load point button 78 does not physically contact the upper surface of slider support beam 48 to provide the preload force to slider 32, as in the embodiment shown in FIG. 3A–3B. Instead, gimbal 34 has an aperture 90 in central tongue 44. Load point button 78 extends though aperture 90 and applies the preload force directly to upper surface 52 of slider 32.

It should be understood that the present invention is not limited to the particular gimbal structures shown in FIGS. 3–4. A variety of other gimbal structures or flexure beam configurations having a slider support tab oriented to locate and support the leading surface of a slider may be used with the present invention. Also, the gimbal may be a separate component from the load beam or may be integrated within the load beam as a single, unitary piece of material.

In addition to providing a location at which to attach slider 32, slider mounting tab 50 provides a convenient location to incorporate one or more microactuation devices for finely tuning the position of the transducers carried by slider 32 relative to the data tracks on the surface of the disc. With MR heads in particular, fine resolution positioning is desired about a yaw axis of slider 32 to compensate for misalignment of the read and write transducers due to varying skew angles with the data tracks. Slider mounting tab 50 locates slider 32 at its leading surface and provides a fixed support for a microactuator to react against.

Figure 5A:
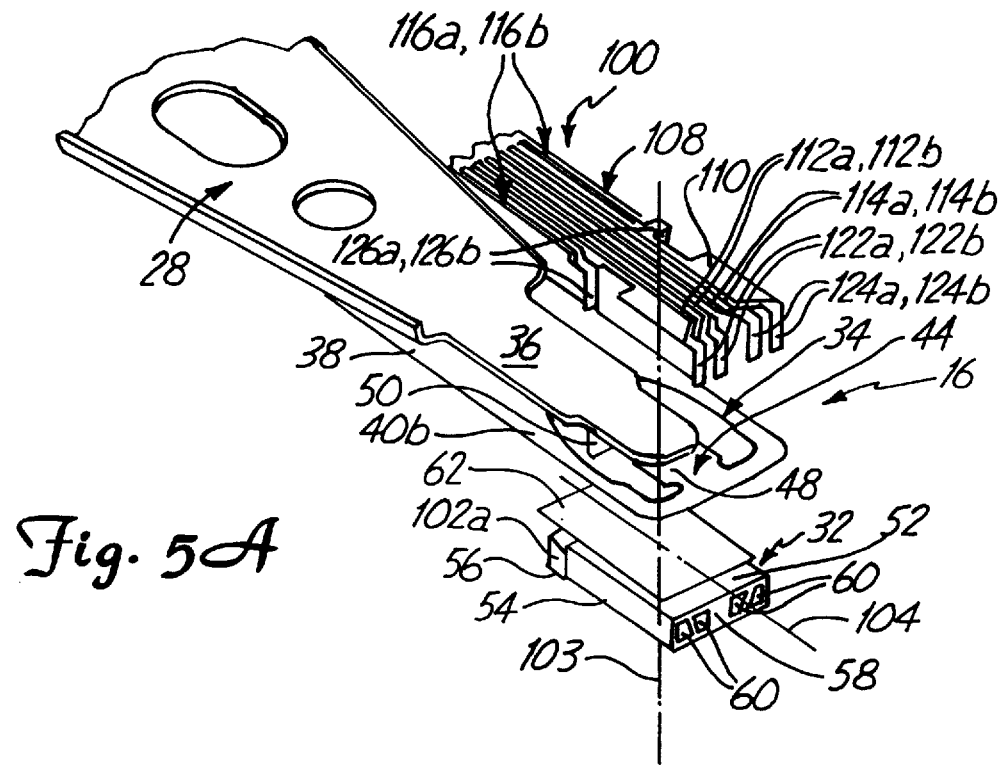
FIG. 5A is a partially exploded, perspective view of a suspension assembly having a flex cable and having microactuators at a leading edge of the slider.

In FIG. 5A, head suspension assembly 100 has microactuators 102a and 102b (102b shown in FIGS. 5B and SC) fabricated on leading surface 56 of slider 32 using traditional thin-film processes that are used to fabricate recording heads. Microactuators 102a and 102b are, in turn, coupled to slider mounting tab 50. Preferably, microactuator 102a is secured at a first side of leading surface 56, and microactuator 102b (shown in FIGS. 5B and 5C) is secured at a second, opposite side of leading surface 56. However, a single microactuator located to one side of leading surface 56 can be used.

A flexible cable assembly 108 is routed along load beam 28. Flexible cable assembly 108 includes a flexible carrier member 110, read/write transducer conductors 112a, 112b, 114a and 114b, and microactuator conductors 116a and 116b. Read/write transducer conductors 112a, 112b, 114a and 114b include contact extensions 122a, 122b, 124a and 124b which are bent at a right angle relative to flexible carrier member 110 to align with electrical bond pads 60 at trailing surface 56 of slider 32. Likewise, microactuator conductors 116a and 116b include contact extensions 126a and 126b which are bent at a right angle relative to flexible carrier member 110 to align with corresponding electrical bond pads (not shown) of microactuators 102a and 102b.

Electrical signals applied through conductors 116a and 116b cause microactuators 102a and 102b to selectively expand and contract the relative distance between each side of leading surface 56 and slider mounting tab 50 to actuate slider 32 relative to yaw axis 103. Actuating slider 32 relative to yaw axis 103 moves transducers 60 laterally relative to a longitudinal axis 104 of suspension assembly 100, which allows micropositioning of transducers 60 during read and write operations.

Figure 5B:
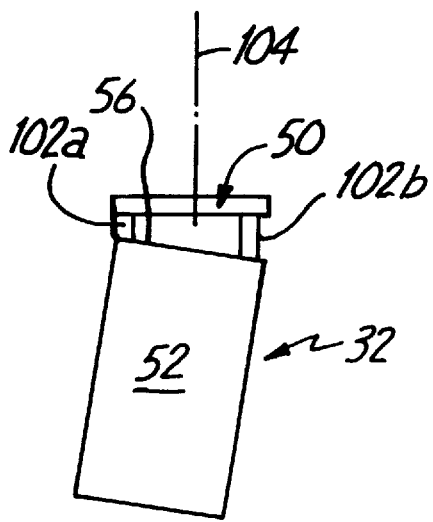
FIGS. 5B and 5C are plan views of a slider attached at its leading surface to a slider mounting tab, which illustrates microactuation of the slider about a yaw axis.
Figure 5C:
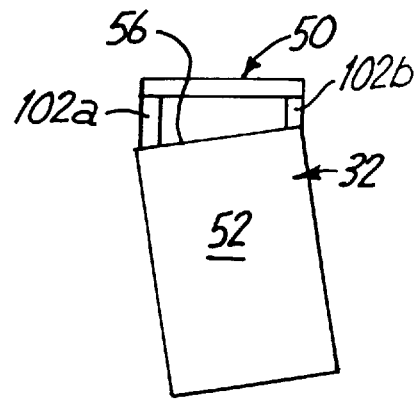

FIGS. 5B and 5C are plan views illustrating the operation of microactuators 102a and 102b. In FIG. 5B, microactuator 102a is contracted and microactuator 102b is expanded such that slider 32 is actuated about yaw axis 103 in a clockwise direction. Alternatively, as shown in FIG. 5C, microactuator 102a is expanded and microactuator 102b is contracted such that slider 32 is actuated about yaw axis 103 in a counter-clockwise direction.

Microactuators 102a and 102b may be formed of a piezoelectric material which includes a lead zirconate titanate (PZT) material, for example. However, other types of microactuators may be used with the present invention, such as electromagnetic, electrostatic, capacitive, fluidic, and thermal microactuators. The structure and operation of microactuators 102a and 102b are described in greater detail in co-pending application U.S. Ser. No. 08/852,081, filed on even data herewith and entitled "SLIDER-MOUNTED MICROACTUATOR," which is hereby incorporated by reference.

Figure 6:
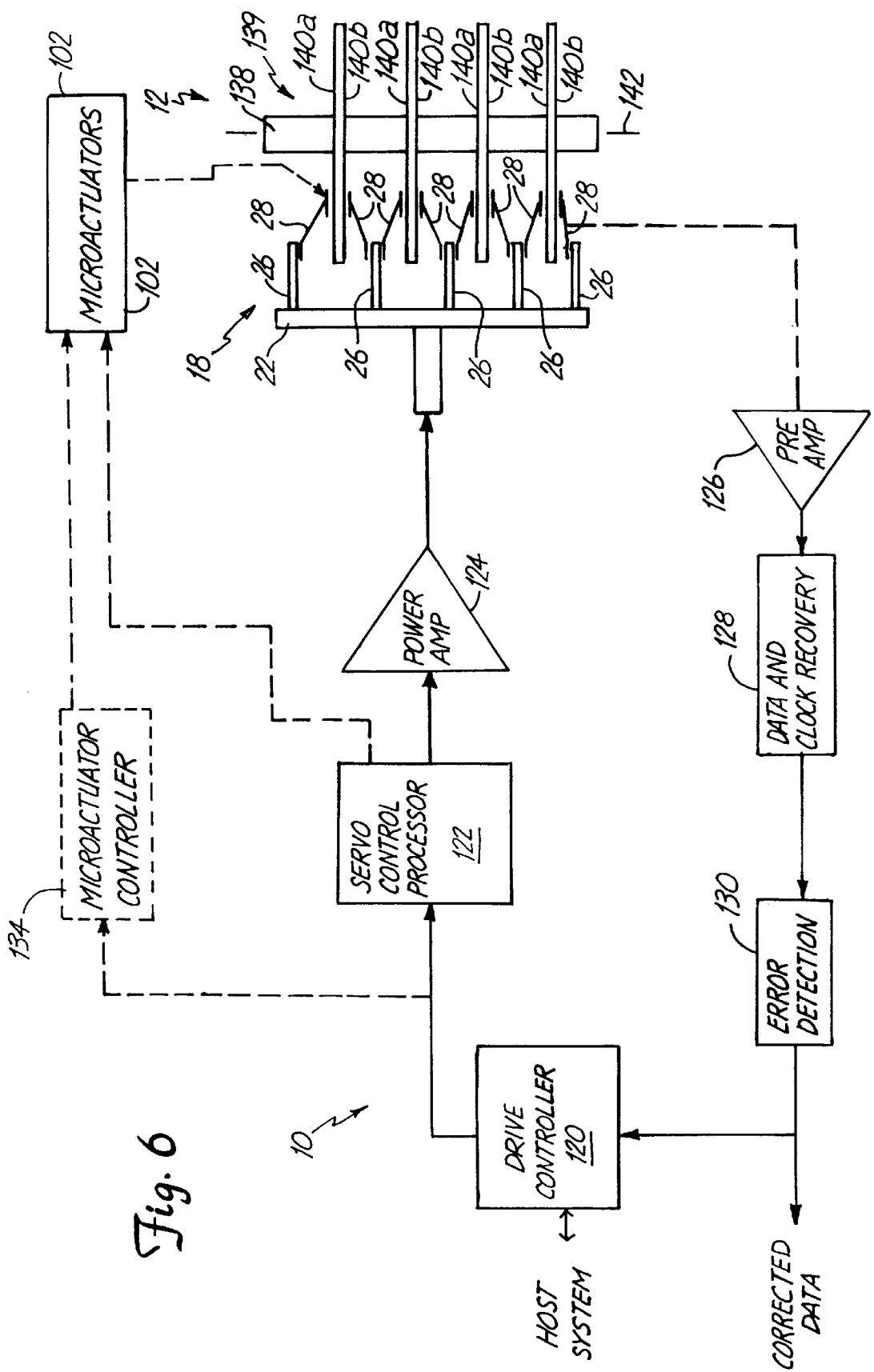
FIG. 6 is a block diagram of the disc drive, which illustrates actuator position control circuitry.

FIG. 6 is a block diagram of disc drive 10, which illustrates the position control circuitry in greater detail. Disc drive 10 includes drive controller 120, servo control processor 122, power amplifier 124, actuator assembly 18, disc pack 12, preamplifier 126, data and clock recovery circuit 128, error detection circuit 130, a plurality of microactuators illustrated generally at 102 and, optionally, a microactuator controller 134. Drive controller 120 is typically a microprocessor or digital computer, and is coupled to a host system or another drive controller which controls a plurality of drives.

Disc pack 20 includes spindle 138 which supports a plurality of coaxially arranged discs 139. Discs 139 are mounted for rotation with spindle 138 about axis of rotation 142. Each disc 139 has a first surface 140a and a second surface 140b. Surfaces 140a and 140b include concentric tracks for receiving and storing data in the form of flux reversals encoded on the tracks.

Actuator assembly 18 includes base 22 supporting the plurality of actuator arms 26. Each of the actuator arms 26 is coupled to at least one of the load beams 28, which supports one of the head gimbal assemblies 16 (labeled in FIG. 3) above a corresponding disc surface, 140a or 140b, for accessing data within the tracks on the disc surface. Each head assembly includes at least one microactuator 102, as described above, for finely positioning the head assemblies within a track on discs 139.

In operation, drive controller 120 typically receives a command signal from a host system which indicates that a certain portion of one or more of discs 139 are to be accessed. In response to the command signal, drive controller 120 provides servo control processor 122 with a position signal which indicates a particular cylinder over which actuator assembly 18 is to position the head gimbal assemblies. Servo control processor 122 converts the position signal into an analog signal which is amplified by power amplifier 124 and is provided to actuator assembly 18. In response to the analog position signal, actuator assembly 18 positions load beams 28 and their associated head gimbal assemblies over a desired cylinder.

The head gimbal assemblies generate a read signal containing data from a selected portion of the disc to be read. The read signal is provided to preamplifier 126 which amplifies the read signal and provides it to data and clock recovery circuit 128. Data and clock recovery circuit 128 recovers data from the read signal, which is encoded on the disc surface when the data is written to the disc surface, in a known manner. Once the data is recovered, it is provided to error detection circuit 130 which detects whether any errors have occurred in the data read back from the disc. Correctable errors are corrected by error detection circuit 130 or drive controller 120, or a combination of both, in a known manner.

During head positioning, drive controller 120 provides a position signal to servo control processor 122 causing actuator assembly 18 to position the head gimbal assemblies over a selected cylinder. In a sector servo positioning drive, a portion of each sector has position information which is read by the data head and provided, through the read channel, to servo control processor 122. The positioning information gives tuning feedback to the servo control processor for better positioning. The present system could also be used in a dedicated servo system in which one of the surfaces, 140a or 140b, of a disc 139 is dedicated to servo information. In either type of system, servo control processor 122 reacts to the position information read from disc pack 12 and positions the head gimbal assemblies accordingly.

Using a rotary actuator introduces a skew angle between data tracks and the axis of a dual gap head. The skew changes as the data head moves from the inner diameter of the disc to the outer diameter of the disc. Therefore, performance of a dual gap magnetic head can be optimized for a particular track on a magnetic disc by aligning the write gap with the data track when writing information and aligning the read gap with the data track when reading information.

In the preferred embodiment, the offset between the read and write transducers for each head gimbal assembly is precharacterized and parameters indicative of that offset are stored in memory associated with servo control processor 122. Therefore, when drive controller 120 provides position information to servo control processor 122, servo control processor 122 not only acts to position the head gimbal assemblies over a desired cylinder, but servo control processor 122, or a separate microactuator controller 134, also provides an analog control signal to the appropriate microactuator 102 to position the desired data head within a track to be written to, or read from, in order to overcome the offset between the read and write transducers and the skew angle.

Although the present invention has been described with reference to preferred embodiments, workers skilled in the art will recognize that changes may be made in form and detail without departing from the spirit and scope of the invention.

What is claimed is:

1. A head gimbal assembly of a disc drive, comprising:
   a slider including a leading surface, a trailing surface which is opposite to the leading surface, a bearing surface and an upper surface which is opposite to the bearing surface; and
   a gimbal including a gimbal body and a slider mounting tab, wherein the slider mounting tab extends from the gimbal body in a plane generally parallel to the leading surface and supports the slider at the leading surface.

2. The head gimbal assembly of claim 1 wherein the gimbal further includes a cantilevered member having a proximal end which is supported by the gimbal body and a distal end which supports the slider mounting tab.

3. The head gimbal assembly of claim 2 wherein the slider mounting tab is bent out of plane with respect to the cantilevered member such that slider mounting tab and the cantilevered member form an "L" shape.

4. The head gimbal assembly of claim 2 wherein the gimbal body includes:
   opposed gimbal arms supported in a spaced relation to define a gap therebetween; and
   a cross beam which extends between the opposed gimbal arms, the cantilevered member being supported relative to the cross beam and extending therefrom into the gap.

5. The head gimbal assembly of claim 2 wherein:
   the slider is supported solely at the leading surface by the slider mounting tab and at the upper surface by the cantilevered member.

6. The head gimbal assembly of claim 5 and further including a shear compliant layer having upper and lower surfaces, the upper surface of the shear compliant layer being coupled to the cantilevered member and the lower surface of the shear compliant layer being coupled to the upper surface of the slider.

7. The head gimbal assembly of claim 6 wherein the shear compliant layer comprises a mylar film material.

8. The head gimbal assembly of claim 2 wherein:
   the slider is supported solely at the leading surface by the slider mounting tab.

9. The head gimbal assembly of claim 8 and further comprising a lubricant applied between the cantilevered member and the upper surface of the slider.

10. The head gimbal assembly of claim 1 and further including:
    a microactuator assembly coupled between the slider mounting tab and the leading surface of the slider.

11. The head gimbal assembly of claim 10 wherein the microactuator assembly includes a piezoelectric microactuator.

12. The head gimbal assembly of claim 11 wherein the microactuator assembly comprises:
    first and second spaced piezoelectric microactuators coupled to opposed ends of the leading surface of the slider to selectively expand and contract a distance between each end of the leading surface and the slider mounting tab for providing micromovement of the slider relative to the gimbal body.

13. A suspension assembly for supporting a slider having a leading surface relative to a disc surface of a disc drive, comprising:
    a load beam having a distal end; and
    a gimbal supported at the distal end of the load beam and comprising a gimbal body and a generally planar slider mounting tab which is supported by the gimbal body, wherein the slider mounting tab is bent out of plane with respect to the gimbal body for alignment with and attachment to the leading surface of the slider.

14. The suspension assembly of claim 13 wherein the load beam and the gimbal are formed of separate pieces of material which are attached to one another.

15. The suspension assembly of claim 13 wherein the load beam and the gimbal are formed of a single, continuous piece of material.

16. The head gimbal assembly of claim 13 wherein the gimbal body includes:
    opposed gimbal arms supported in a spaced relation to define a gap therebetween; and
    a cross beam which extends between the opposed gimbal arms; and
    a cantilevered member which extends from the cross beam into the gap, wherein the slider mounting tab extends out of plane from the cantilevered member.

17. The suspension assembly of claim 13 and further comprising:
    a microactuator assembly coupled to the slider mounting tab.

18. A gimbal for supporting a slider in a disc drive assembly, the gimbal comprising:
    a gimbal body;
    a slider support beam carried by the gimbal body and defining a vertical slider alignment feature; and
    a slider mounting tab extending out of plane from the slider support beam and defining a horizontal slider alignment feature.

19. The gimbal of claim 1 wherein the gimbal body comprises:
    opposed gimbal arms supported in a spaced relation to define a gap therebetween;
    a cross beam which extends between the opposed gimbal arms; and
    a slider support beam which extends from the cross beam into the gap, wherein the slider mounting tab extends from a distal end of the slider support beam.

20. A disc drive assembly, comprising:
    a housing;
    a spindle motor attached to the housing;
    at least one data storage disc rotatably supported in the housing;
    an actuator assembly attached to the housing;
    a gimbal supported by the actuator assembly and comprising a gimbal body and a generally planar slider mounting tab which is supported by the gimbal body and is out of plane with respect to the gimbal body;

a slider having a leading surface relative to a direction of rotation of the disc which is parallel to the slider mounting tab, wherein the slider is carried at the leading surface by the slider mounting tab; and a transducer carried by the slider.

21. A head gimbal assembly comprising:

a slider having a leading surface, a trailing surface which is opposite to the leading surface, first and second side surfaces, a bearing surface and an upper surface which is opposite to the bearing surface; and a gimbal having a gimbal body and means for supporting the slider at the leading surface to allow relative movement between the upper surface of the slider and the gimbal body.

22. The head gimbal assembly of claim 21 wherein the means for supporting the slider comprises:

a beam supported by the gimbal body in a plane that is parallel to the upper surface of the slider; and a slider mounting tab extending from the beam in a plane that is parallel to the leading surface of the slider.

23. The head gimbal assembly of claim 22 and further comprising a shear compliant layer attached between the beam and the upper surface of the slider.

24. The head gimbal assembly of claim 22 and further comprising a lubricant positioned between the beam and the upper surface of the slider.

25. A method of assembling a slider which has a leading surface and an upper surface to a gimbal having a slider support beam, the method comprising:

providing a slider mounting tab on the slider support beam which lies in a plane that is generally parallel to the leading surface of the slider;

aligning the leading surface of the slider to the slider mounting tab to provide a longitudinal alignment of the slider relative to the slider support beam;

aligning the upper surface of the slider to the slider support beam to provide a vertical alignment of the slider relative to the slider support beam; and securing the leading surface of the slider to the slider mounting tab.

26. The method of claim 25 and further comprising applying a microactuator assembly between the slider mounting tab and the leading surface of the slider.

* * * * *